United States Patent
Shi et al.

(10) Patent No.: US 8,545,952 B2
(45) Date of Patent: Oct. 1, 2013

(54) POLYESTER CONTAINER WITH ENHANCED GAS BARRIER AND METHOD

(75) Inventors: Yu Shi, Branchburg, NJ (US); Robert J. Schiavone, Matthews, NC (US); Chantel Walters, Toledo, OH (US); Robert Kriegel, Marietta, GA (US); Xiaoyan Huang, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 1043 days.

(21) Appl. No.: 11/164,181

(22) Filed: Nov. 14, 2005

(65) Prior Publication Data
US 2006/0275568 A1    Dec. 7, 2006

Related U.S. Application Data

(63) Continuation-in-part of application No. 11/146,918, filed on Jun. 7, 2005, now abandoned.

(51) Int. Cl.
*B32B 1/00*      (2006.01)
*B32B 1/02*      (2006.01)

(52) U.S. Cl.
USPC ....... 428/36.4; 428/35.7; 428/35.8; 428/36.6; 428/36.92

(58) Field of Classification Search
USPC ............... 428/34.1, 34.8, 35.2, 35.3, 35.4, 428/35.5, 35.7, 35.8, 35.9, 36.4, 36.6, 36.7, 428/36.9, 36.92
See application file for complete search history.

(56) References Cited

U.S. PATENT DOCUMENTS

| | | | |
|---|---|---|---|
| 4,404,805 A | | 9/1983 | Curtil |
| 4,412,804 A | | 11/1983 | Huther |
| 4,474,918 A | | 10/1984 | Seymour et al. |
| 4,574,148 A | | 3/1986 | Wicker et al. |
| 4,820,795 A | * | 4/1989 | Hirata et al. ........... 528/272 |
| 4,861,256 A | | 8/1989 | Covey |
| 4,874,647 A | * | 10/1989 | Yatsu et al. ........... 428/35.7 |
| 4,882,410 A | | 11/1989 | Neugebauer et al. |
| 5,011,720 A | | 4/1991 | Jabarin |

(Continued)

FOREIGN PATENT DOCUMENTS

| EP | 0 395 233 A1 | 10/1990 |
|---|---|---|
| EP | 0 395 237 A1 | 10/1990 |

(Continued)

OTHER PUBLICATIONS

Maeda, Y., et al., "Effect of Antiplasticization on Gas Sorption and Transport. I. Polysulfone," *Journal of Polymer Science: Part B: Polymer Physics*, vol. 25, 957-980 (1987).

(Continued)

*Primary Examiner* — Walter B Aughenbaugh
(74) *Attorney, Agent, or Firm* — Sutherland Asbill & Brennan LLP

(57) ABSTRACT

A polyester container with enhanced gas barrier properties includes a polyester composition having an IV of 0.65 dL/g to 1.0 dL/g and including a polyester and a reactive organic gas barrier enhancing additive. The polyester is made using at least one first polycondensation catalyst, non-limiting examples of which include metals in Groups 3, 4, 13, and 14 of the Periodic Table and includes a catalyst residue remaining in the polyester from formation of the polyester. The catalyst residue includes at least a portion of the at least one first polycondensation catalyst.

14 Claims, 2 Drawing Sheets

(56) References Cited

U.S. PATENT DOCUMENTS

| | | | |
|---|---|---|---|
| 5,021,515 A | 6/1991 | Cochran et al. | |
| 5,466,141 A | 11/1995 | Eckardt et al. | |
| 5,473,161 A | 12/1995 | Nix et al. | |
| 5,588,598 A | 12/1996 | Becker et al. | |
| 5,662,926 A | 9/1997 | Wick et al. | |
| 5,679,373 A | 10/1997 | Wick et al. | |
| 5,700,554 A | 12/1997 | Speer et al. | |
| 5,744,056 A | 4/1998 | Venkateshwaran et al. | |
| 5,837,186 A | 11/1998 | Gotterbauer | |
| 5,888,598 A | 3/1999 | Brewster et al. | |
| 5,914,138 A | 6/1999 | Swenson | |
| 5,952,066 A * | 9/1999 | Schmidt et al. | 428/35.9 |
| 6,010,715 A | 1/2000 | Wick et al. | |
| 6,150,450 A | 11/2000 | Sekiyama et al. | |
| 6,150,454 A | 11/2000 | Wu et al. | |
| 6,320,014 B1 | 11/2001 | Takahashi et al. | |
| 6,489,386 B1 | 12/2002 | Plotzker et al. | |
| 6,573,304 B1 * | 6/2003 | Durand et al. | 521/48 |
| 6,596,213 B2 | 7/2003 | Swenson | |
| 6,667,383 B2 | 12/2003 | Fujimori et al. | |
| 6,680,093 B1 | 1/2004 | Ries et al. | |
| 6,720,052 B1 | 4/2004 | Rule et al. | |
| 6,740,378 B1 | 5/2004 | Rule et al. | |
| 6,749,785 B2 * | 6/2004 | Subramanian et al. | 264/173.16 |
| 6,756,013 B1 | 6/2004 | Cornell et al. | |
| 6,808,753 B2 | 10/2004 | Rule et al. | |
| 6,811,826 B2 | 11/2004 | Rule et al. | |
| 6,982,119 B2 | 1/2006 | Shi | |
| 2002/0198331 A1 | 12/2002 | Nishihara et al. | |
| 2003/0194517 A1 | 10/2003 | Shi | |
| 2003/0194563 A1 | 10/2003 | Shi | |
| 2004/0091651 A1 | 5/2004 | Rule | |
| 2004/0116619 A1 | 6/2004 | Moad et al. | |
| 2004/0247739 A1 | 12/2004 | Sabin et al. | |
| 2005/0082707 A1 | 4/2005 | Sabin et al. | |
| 2005/0100696 A1 | 5/2005 | Shi | |
| 2005/0118371 A1 | 6/2005 | Shi et al. | |
| 2005/0153084 A1 | 7/2005 | Shi | |
| 2005/0221036 A1 | 10/2005 | Shi | |
| 2005/0260371 A1 | 11/2005 | Shi et al. | |
| 2005/0279707 A1 | 12/2005 | Matthews et al. | |
| 2006/0246242 A1 | 11/2006 | Siegel et al. | |
| 2006/0257602 A1 | 11/2006 | Shi | |
| 2006/0257603 A1 | 11/2006 | Shi et al. | |
| 2007/0014953 A1 | 1/2007 | Siegel et al. | |
| 2007/0082156 A1 | 4/2007 | Shi et al. | |
| 2008/0113134 A1 | 5/2008 | Shi et al. | |

FOREIGN PATENT DOCUMENTS

| | | |
|---|---|---|
| EP | 0 678 554 A1 | 10/1995 |
| EP | 0899285 | 3/1999 |
| GB | 1434828 | 5/1976 |
| JP | 61195155 | 8/1986 |
| JP | 63-202648 | 8/1988 |
| JP | 3-252450 | 11/1991 |
| JP | 5339357 | 12/1993 |
| JP | 2000212302 | 2/2000 |
| JP | 2004-197088 | 7/2004 |
| WO | 94/26622 | 11/1994 |
| WO | WO 01/12521 A1 | 2/2001 |
| WO | 2004/041496 | 5/2004 |
| WO | 2004/113414 | 12/2004 |
| WO | 2005/014254 | 2/2005 |

OTHER PUBLICATIONS

Maeda, Y., et al., "Effect of Antiplasticization on Gas Sorption and Transport. II. Poly(phenylene Oxide)," *Journal of Polymer Science: Part B: Polymer Physics*, vol. 25, 981-1003 (1987).

Maeda, Y., et al., "Effect of Antiplasticization on Gas Sorption and Transport. III. Free Volume Interpretation," *Journal of Polymer Science: Part B: Polymer Physics*, vol. 25, 1005-1016 (1987).

Maxwell, et al., "Secondary relaxation processes in polyethylene terephthalate-additive blends: 2. Dynamic mechanical and dielectric investigations," *Polymer*, vol. 39. No. 26, 6851-6859 (1998).

Robeson, L. M., et al., "Secondary Loss Transitions in Antiplasticized Polymers," *Polymer* Science, Part B, vol. 7, 35-40 (1969).

"Nylon-MXD6 (PA-MXD6)," posted at the Mitsubishi Chemical Inc.'s website.

Smezhkov, V., "PET: With a Solid Step," *PakkoGraff*, No. 3, Russia (2001).

Disclosure under 37 C.F.R. 1.56 dated Feb. 16, 2010.

Thiele, Ulrich K., "Polyester Bottle Resins" Chapter B-2 Melt Phase Polycondensation, vol. 5, pp. 2, 23-30, 313-320.

* cited by examiner

POLYESTER CONTAINER WITH ENHANCED GAS BARRIER AND METHOD

CROSS REFERENCE TO RELATED APPLICATIONS

This application claims priority under 35 U.S.C. §120 to and is a continuation-in-part of U.S. patent application Ser. No. 11/146,918 filed on Jun. 7, 2005, now abandoned, the disclosure of which is expressly incorporated herein by reference in its entirety.

FIELD OF THE INVENTION

This invention relates to polyester containers. In particular, this invention relates to polyester containers for use in applications wherein enhanced gas barrier is desirable.

BACKGROUND OF THE INVENTION

Polyethylene terephthalate and its copolyesters (hereinafter referred to collectively as "PET") are widely used to make containers for carbonated soft drinks, juice, water, and the like due to their excellent combination of clarity, mechanical, and gas barrier properties. In spite of these desirable characteristics, insufficient gas barrier of PET to oxygen and carbon dioxide limits application of PET for smaller sized packages, as well as for packaging oxygen sensitive products, such as beer, juice, and tea products. A widely expressed need exists in the packaging industry to further improve the gas barrier properties of PET.

The relatively high permeability of PET to carbon dioxide limits the use of smaller PET containers for packaging carbonated soft drinks. The permeation rate of carbon dioxide through PET containers is in the range of 3 to 14 cc's per day or 1.5 to 2% per week loss rate at room temperature depending on the size of the container. A smaller container has a larger surface area to volume ratio resulting in a higher relative loss rate. For this reason, PET containers are currently used only as larger containers for packaging carbonated soft drinks, while metal cans and glass containers are the choice for smaller carbonated soft drink containers.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5% of the carbon dioxide in the container is lost due to permeation of the carbon dioxide through the container side wall and closure. The permeability of PET to carbon dioxide therefore determines the shelf life of the packaged carbonated beverage and thus, the suitability of PET as a packaging material.

Numerous technologies have been developed or are being developed to enhance the barrier of PET to small gas molecules. For example, external or internal coatings for enhancing the gas barrier of PET containers have been developed. The coating layer is normally a very high barrier layer, either inorganic or organic, and slows down the diffusion of gases. Implementation of this technology, however, requires coating equipment not normally utilized in the manufacture of packaged beverages and therefore requires substantial capital investment, increased energy usage, and increased floor space. In many beverage packaging plants that are already crowded, the additional space is not an option.

Multi-layered containers have also been developed with a high barrier layer sandwiched between two or more PET layers. Implementation of this technology also requires substantial capital investment and delamination of the container layers impacts appearance, barrier, and mechanical performance of the containers.

A barrier additive for the PET or a polymer with inherent barrier properties would be preferred solutions. Neither such solution requires additional capital investment, and therefore, does not have the limitations inherent with other technologies. A barrier additive can also be added during the injection molding process which gives more flexibility for downstream operations.

L. M. Robeson and J. A. Faucher disclose in J. Polymer Science, Part B 7, 35-40 (1969) that certain additives could be incorporated into polymers to increase their modulus and gas barrier properties through an antiplasticization mechanism. This article discloses utilizing additives with polycarbonate, polyvinyl chloride, polyphenylene oxide, and polythyelene oxide.

In WO 01/12521, Plotzker et al. proposed the use of additives selected from 4-hydroxybenzoates and related molecules to increase the gas barrier properties of PET. This published patent application discloses barrier additives of the following structure:

HO—Ar—COOR, HO—Ar—COOR1COO-AR—OH, HO-AR—CONHR, HO-AR—CO—NHR3-COO-AR—OH, HO-AR—CONHR2NHCO-AR—OH

In the foregoing structure, AR is selected from the group consisting of substituted or unsubstituted phenylene or naphthalene. And R1, R2, and R3 are selected from the group consisting from C1 to C6 alkyl groups, a phenyl group, and a naphthyl group.

The foregoing additives described in the art provide only moderate improvement in PET barrier, less than 2.1 times (×) for oxygen barrier for the best examples with a 5 weight percent loading level. At this loading level, however, PET experiences substantial degradation and a significant drop in intrinsic viscosity (IV). Although lowering the level of additive reduces the degradation of PET, it also reduces the barrier improvement factor, so much so that no real benefit exists in using these additives in packaging carbonated soft drinks or oxygen sensitive food. Part of the IV loss is due to the addition of the small molecular additive. Additional IV loss results when additives contain functional groups capable of reacting with PET and causing the break down of the molecular weight. Additives with reactive functional groups usually are more soluble in PET and thus do not impart haziness in the bottle. PET with a significantly lower IV cannot be used in blow molding containers, such as beverage containers. Furthermore, lower IV PET makes containers with poor mechanical performance, such as creep, drop impact, and the like. Still further, PET containers made from lower IV PET have poor stress cracking resistance, which is undesirable in container applications.

PET has been modified or blended with other components to enhance the gas barrier of the PET. Examples include polyethylene naphthalate (PEN)/PET copolymers or blends, isophthalate (IPA) modified PET, PET blended with polyethylene isophthalate (PEI) or a polyamide, such as nylon, and PET modified with resorcinol based diols. For a PET copolymer to achieve moderate barrier enhancement of 2× or higher, the modification is normally more than 10 to 20 weight or mole percent of the total co-monomers. When PET is modified to such a high level, the stretching characteristics of the PET are changed dramatically such that the normal PET container preform design could not be used in the manufacture of containers. Using these PET copolymers to mold conventional PET container preforms results in preforms that can not be fully stretched and the ultimate containers are very difficult, if not impossible, to make. Even if such a container can be made, it does not show improved barrier performance and shows deteriorated physical performance such that it can not be used to package carbonated soft drinks. U.S. Pat. Nos. 5,888,598 and 6,150,450 disclose redesigned PET container preforms with thicker side walls to compensate for the increased stretch ratio. This thicker preform, however, requires new molds which require additional capital investment. The thicker preform is also made at a lower rate of productivity because it takes longer to cool and heat the thicker wall preform. Furthermore, PET blends with polyamide such as nylon developed yellowness and haze and are not clear like conventional PET.

Thus, there is a need in the art to enhance the barrier performance of PET for use in applications that will require enhanced barrier, such as in the packaging of carbonated beverages and oxygen sensitive beverages and foods, in a manner that does not cause substantial degradation of the PET, does not substantially impact the stretch ratio of the PET, and does not negatively impact the clarity of the PET.

SUMMARY OF THE INVENTION

This invention addresses the above described need for an enhanced gas barrier container by providing a polyester container with enhanced gas barrier properties comprises a polyester composition having an IV of 0.65 dL/g to 1.0 dL/g and comprising a polyester and a reactive organic gas barrier enhancing additive. The polyester is made using at least one first polycondensation catalyst preferably selected from the group consisting of metals in groups 3, 4, 13, and 14 of the Periodic Table and comprises a catalyst residue remaining in the polyester from formation of the polyester. The catalyst residue comprises at least a portion of the at least one first polycondensation catalyst. Because of the selection of the first polycondensation catalyst, the polyester container of this invention has a relatively high gas barrier, but does not have substantially impaired physical properties. Specifically, selecting the first polycondensation catalyst from groups 3, 4, 13 and 14 of the Periodic Table reduces or prevents reaction of the reactive organic gas barrier additive with the polyester and thus reduces or prevents molecular weight breakdown of the polyester Accordingly, the polyester composition maintains a high IV and experiences a relatively low IV drop. For PET made with catalysts outside of groups 3, 4, 13 and 14, the catalyst residue is capable of catalyzing the reaction of reactive barrier additive with polyester and causing excessive IV drop of polyester.

Furthermore, in a preferred embodiment, the selected first polycondensation catalyst can be effectively deactivated by a catalyst deactivating agent which reduces the reactivity of the catalyst residue with the polyester. Thus, this invention allows the reactive organic gas barrier enhancing additive to function in the polyester composition without interference from the residual catalyst.

In accordance to a particular embodiment, the polyester in the polyester composition comprises a poly(ethylene terephthalate) based copolymer (PET copolymer). In a desired embodiment, the polyester comprises a PET copolymer having less than 20% diacid component modification and/or less than 10% diol component modification, based on 100 mole % diacid component and 100 mole % diol component.

The polyester composition desirably comprises a polyester having catalyst residues from metals in groups 3 and 4 of the periodic table, or groups 13 and 14 of the periodic table. In a desirable embodiment, the catalyst residues contain titanium, aluminum, germanium, or gallium.

According to another embodiment, this invention encompasses a method for enhancing gas barrier properties of a polyester composition comprising blending a polyester with a reactive organic gas barrier enhancing additive to form a polyester composition having an IV of 0.65 dL/g to 1.0 dL/g. The polyester is made using at least one first polycondensation catalyst selected from the group consisting of metals in groups 3, 4, 13, and 14 of the Periodic Table. The polyester composition comprises a catalyst residue remaining in the polyester from formation of the polyester and the catalyst residue comprises at least a portion of the at least one first polycondensation catalyst. The polyester composition is formed into the container.

According to a particular embodiment of the invention, the step of blending further comprises the steps of heating the polyester in solid form to melt the polyester which has a free volume, adding the organic gas barrier enhancing additive to the polyester, and mixing the organic gas barrier enhancing additive with the molten polyester at conditions such that at least a portion of the organic gas barrier enhancing additive remains unreacted with the polyester and is disposed in the free volume of the polyester.

Furthermore, in another embodiment of the invention, the step of forming the container comprises stretch blow molding. Particular embodiments of this invention provide polyester containers, such as PET containers, with enhanced gas barrier, and in particular, enhanced barrier to carbon dioxide and oxygen. This makes certain embodiments of this invention particularly suited for packaging carbonated soft drinks and oxygen sensitive beverages and foods. Particular embodiments achieve this enhanced gas barrier while maintaining acceptable physical properties and clarity.

In a particular embodiment, a polycondensation catalyst deactivating agent is blended into the polyester composition and reduces the reactivity of the catalyst residue.

Other objects, features, and advantages of this invention will become apparent from the following detailed description, drawings, and claims.

DETAILED DESCRIPTION OF EMBODIMENTS

Figure 1:
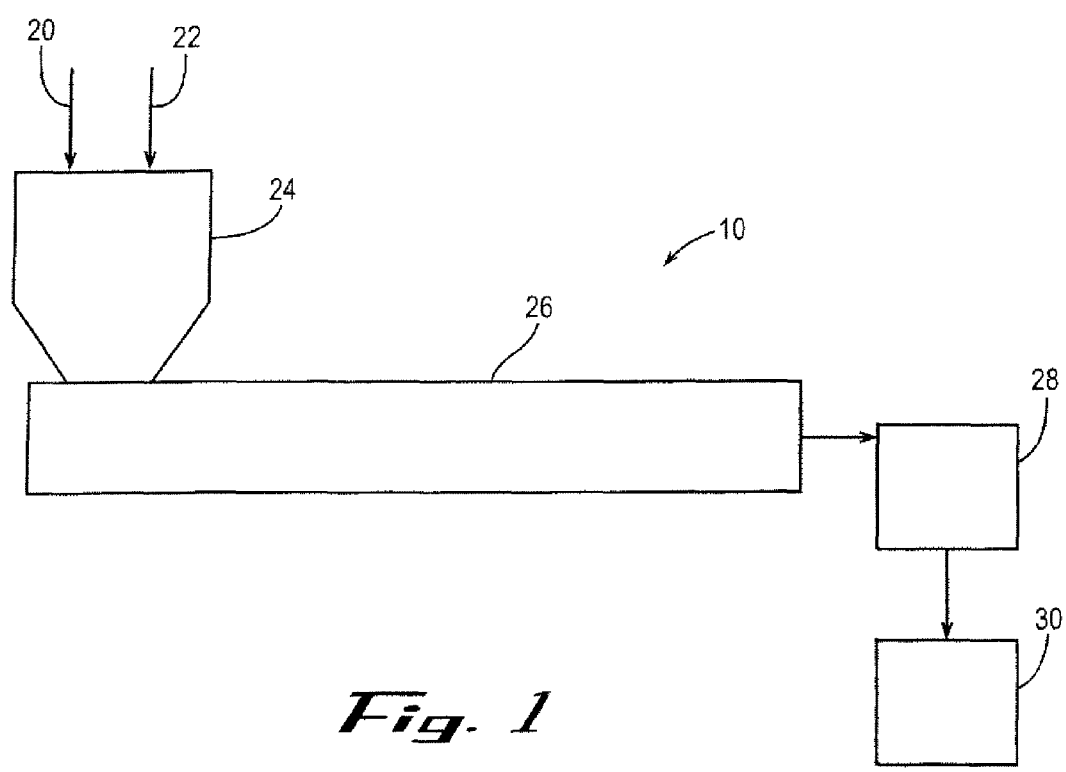
FIG. 1 is a schematic illustration of a system for making a PET container with enhanced gas barrier in accordance with an embodiment of this invention.

This invention encompasses a polyester container with enhanced gas barrier and a method for making a polyester container with enhanced gas barrier. As explained in more detail below, embodiments of this invention provide a polyester container with enhanced barrier to gases, optical clarity and good physical properties.

This invention is applicable to any polyester and is suitable for uses in which a high gas barrier is desirable. Suitable polyesters for use in embodiments of this invention include PET copolymers, polyethylene naphthalate (PEN), polyethylene isophthalate, and the like. PET copolymers are particularly useful because they are used for many barrier applications such as films and containers. Suitable containers include but are not limited to bottles, drums, carafes, coolers, and the like.

PET copolymers suitable for use in embodiments of this invention comprise a diol component having repeat units from ethylene glycol and a diacid component having repeat units from terephthalic acid. Desirably, in some embodiments, the PET copolymer has less than 20% diacid component modification and/or less than 10% diol component modification, based on 100 mole % diacid component and 100 mole % diol component. Such PET copolymers are well known.

In accordance with embodiments of this invention, suitable organic gas barrier enhancing additives are selected based on their affinity to their respective polyester, such as PET copolymer, and its tendency not to react with the respective polyester. Polyesters, including PET copolymers, have free volume between polymer chains. As is known to those skilled in the art, the amount of free volume in polyesters such as PET copolymers determines their barrier to gas molecules. The lower the free volume, the lower the gas diffusion, and the higher the barrier to gas molecules. Effective additives should therefore have good affinity toward polyesters. The affinity of the additive to the respective polyester should be close enough that the additive can be incorporated closely in between the polyester chains to fill the free volume when the additive is blended with the polyester such as during the melt processing of the polyester. Preferably, the effective additives that fill polyester free volume also behave as antiplasticizers to restrict polymer chain mobility, reducing the diffusion and thus permeation of the gas molecules.

Desirably, the organic gas barrier enhancing additive is at least partially disposed in the free volume of the polyester between the polyester chains and solidifies in the free volume when the blend is cooled down to room temperature after melt processing. If the affinity of an additive is too low it can not disperse in the polyester on a molecular level and fill the free volume in the polyester. Low affinity additives can actually separate polyester chains and behave like a plasticizer, increasing the free volume of the polyester and increasing the gas permeability of the polyester as well as producing articles that lack optical clarity.

Organic compounds which are structurally similar to the respective polyester tend to have good affinity toward the polyester. According to embodiments of this invention, desirable organic gas barrier enhancing additives have one or more and preferably two or more molecular structural components in common with the respective polyester to which it is to be blended. For example, if a polyester has alkyl groups, phenyl groups, or naphthyl groups, organic additives with an affinity for the polyester would have some of these molecular structural components as well.

The affinity of a candidate organic barrier enhancing compound can be predicted based on the proximity of the solubility parameter of the candidate additive compound as compared with the solubility parameter of the polyester. The closer the solubility parameter of the candidate additive and the polyester, the better the affinity and the dispersion of the candidate additive into the polyester at a molecular level to fill the free volume of the polyester and increase the gas barrier of the polyester. Those skilled in the art can calculate the solubility parameter of compounds using the group addition rules such as in the method of Hoy described in Krevelen D. W. Van, Properties of Polymers, published by Elsevier, 3rd completely revised edition, 1990.

In accordance with embodiments of this invention, the solubility parameter of the organic gas barrier enhancing additive is no more than 20% lesser or greater than the solubility parameter of the polyester. Preferably, the solubility parameter of the organic gas barrier enhancing additive compound is no more than 15% lesser or greater than the solubility parameter of the polyester and even more preferably the solubility parameter of the organic gas barrier enhancing additive is not more than 10% lesser or greater than the solubility parameter of the polyester.

Thus, according to an embodiment of this invention, a suitable method for enhancing gas barrier properties of a polyester composition comprises blending a polyester with a reactive organic gas barrier enhancing additive to form a polyester composition having an IV of 0.65 dL/g to 1.0 dL/g. The polyester is made using at least one first polycondensation catalyst selected from the group consisting of metals in groups 3, 4, 13, and 14 of the Periodic Table. The polyester composition comprises a catalyst residue remaining in the polyester from formation of the polyester and the catalyst residue comprises at least a portion of the at least one first polycondensation catalyst. In desirable embodiments, the catalyst residue is present in the polyester composition in an amount only up to 250 ppm, and is preferably less. The polyester composition is formed into the container.

Using this method, suitable reactive organic gas barrier enhancing additives for use with PET copolymers, in accordance with embodiments of this invention, include those belonging to the groups described as esters, diesters, amides, diamides, polyamides, imides, diimides, polyimides, non carbon based esters, non carbon based diesters, non carbon based polyesters, such as phosphate or sulfate esters, alcohols, dialcohols, polyalcohols, including phenols and phenol-type compounds, and ring opening reactive compounds such as cyclic esters, cyclic amides, anhydrides, and epoxides.

Particularly suitable reactive organic gas barrier enhancing additives for use with PET copolymers, in accordance with embodiments of this invention, include those having the chemical formula R1OOC-AR—COOR2, wherein AR is selected from the group consisting of phenylene and naphthalene, and R1 and R2 are selected from the group consisting of C1 to C6 alkyl groups, a phenyl group, and a naphthyl group. In this case, the term reactive organic gas barrier enhancing additives mean additives that cause loss of intrinsic viscosity (IV) that is significantly greater than that which would normally be observed due to dilution effects from the additive when the additives are combined with PET copolymer made from traditional polycondensation catalyst, such as antimony. According to another embodiment, R1 and R2 are selected from the group consisting of C1 to C6 alkyl groups, a phenyl group, and a naphthyl group. According to a particular embodiment, suitable organic gas barrier enhancing additives for PET copolymers are selected from a group consisting of dimethyl terephthalate, dimethyl isophthalate, 2,6-methyl naphthalate, diethyl terephthalate, and diethyl isophthalate.

The organic gas barrier enhancing additive and the polyester can undergo a transesterification reaction and cause problems in container application such as lowering the IV of the polyester composition to unacceptable levels as explained hereinabove. One method of addressing this problem is by deactivating any residual polycondensation catalyst in the polyester. Transesterification reaction in PET copolymer resin is believed to be catalyzed by the residual polycondensation catalyst. One approach to deactivating these catalysts has been to add catalyst deactivating compounds, such as phosphorus containing compounds, to the polyester composition. Once the catalysts are deactivated, they will not catalyze the transesterification reaction and such reaction will be slowed down during the melt processing of the polyester, such as PET copolymer, and gas barrier enhancing additive blend. The phosphorus containing compounds include both organic and inorganic compounds. Examples include but are not limited to phosphoric acid, polyphosphoric acid, and tris (2,4-di-t-butylphenyl) phosphite, tris monononylphenyl phosphite. These additives are typically added to the polyeate composition in amounts less than 2000 ppm. The extent of this deactivation, however, is not sufficient to eliminate the degradation of the polyester through reaction with the organic barrier enhancing additives when certain polycondensation catalysts are used in the formation of the polyester by polycondensation reaction.

In desirable embodiments, the polyester composition comprises a second polycondensation catalyst selected from the group consisting of cobalt, antimony, zinc, manganese, magnesium, cesium, calcium, and cadmium. The second polycondensation catalyst is present in the polyester composition in an amount only up to 3 ppm of the polyester composition because such catalysts tend to reduce the IV of the polyester composition. Specifically, the reactivity of traditional polycondensation catalysts such as cobalt, antimony, zinc, manganese, magnesium, cesium, calcium, calcium, and cadmium is not mitigated to the extent necessary to make use of the phosphorus-based deactivating agents a viable alternative compared to substantial reduction or elimination of the metal catalyst residues containing cobalt, antimony, zinc, manganese, magnesium, cesium, calcium, or cadmium.

Reaction between the organic gas barrier enhancing additive and the polyester composition can reduce the IV of the polyester composition and resulting container preform. As explained above, PET with a significantly lower IV cannot be used in blow molding containers, such as beverage containers, because lower IV PET makes containers with poor mechanical performance, such as creep, drop impact resistance, and the like. Still further, PET containers made from lower IV PET have poor stress cracking resistance for CSD applications, which is undesirable in container applications. In order to prepare container preforms and containers with adequate physical properties and an IV suitable for efficient molding of the preforms and blow molding of such preforms into containers, the polyester composition desirably has an IV of at least 0.65, more preferably from about 0.65 to about 1.0, and even more preferably from about 0.70 to about 0.86. The units for IV herein are all in dL/g measured according to ASTM D4603-96, in which the IV of PET based resin is measured at 30° C. with 0.5 weight percent concentration in a 60/40 (by weight) phenol/1,1,2,2-tetrachloroethane solution. As discussed above, polyester having residual catalysts with minimal or no cobalt, antimony, zinc, manganese, magnesium, cesium, calcium, and cadmium substantially alleviates reduction in IV. Total cobalt, antimony, zinc, manganese, magnesium, cesium, calcium, and cadmium content is desirably less than 3 ppm.

According to a particular embodiment, suitable organic gas barrier enhancing additives for PET polymers and copolymers are blended with polyester having titanium and aluminum-based metal catalyst residues without the presence of residues containing cobalt, antimony, zinc, manganese, magnesium, cesium, calcium, or cadmium. Other suitable organic gas barrier enhancing additives for PET copolymers and other polyesters will be apparent to those skilled in the art from this specification.

Therefore, the choice of catalyst in the production of the polyester allows for implementation of the invention. Titanium and aluminum based catalysts show excellent results in terms of minimizing excessive IV loss due to reaction with the reactive organic barrier enhancing additive, while polymer resins that employ catalysts, co-catalysts or additives based on cobalt, antimony, zinc, manganese, magnesium, cesium, calcium, and cadmium do little to reduce IV loss. In the use of manganese and cobalt co-catalysts, a deactivating or sequestering agent such as polyphosphic acid or other phosphorous compound is typically added to prevent depolymerization during the second stage of resin production. However, examples herein below show that such deactivating agents cannot deactivate the manganese or cobalt to the degree that is needed to practically employ reactive organic gas barrier enhancing additives. As explained hereinabove, additional catalytically active metals for PET resin production that may be useful in embodiments of this invention come from groups 3 and 4 of the periodic table as well as groups 13 and 14. The periodicity of the elements in the modern periodic table suggests that similar chemical reactivity exists throughout a group. As such, zirconium and halfnium may be useful as analogs for titanium catalysts, and gallium, indium, and thallium may be useful analogs of aluminum. Germanium, tin, and lead from group 14 should also have a reactivity that is suitable for the embodiments of this invention.

A polycondensation catalyst deactivating agent can optionally be added to the polyester composition in an amount to sufficiently deactivate the polycondensation catalyst residue in the polyester composition so that the reactive organic gas barrier enhancing additive is able to sufficiently enhance the gas barrier properties of the polyester composition and the resulting polyester container. In accordance with embodiments of this invention, the polycondensation catalyst deactivating agent is present in the polyester composition in amount from 10 to 500 ppm by weight of the polyester composition and preferably is present in the polyester composition in amount from 100 to 500 ppm by weight of the polyester composition.

Likewise, the organic gas barrier enhancing additive compound is added to the polyester composition in an amount sufficient to enhance the gas barrier properties of the polyester. In accordance with an embodiment of this invention, the polyester is present in the polyester composition in amount from 99.99% to 90% by weight of the polyester composition and the organic gas barrier enhancing additive is present in the polyester composition in an amount of 0.01% to about 10% by weight of the polyester composition. In accordance to another embodiment of this invention, the PET copolymer is present in the polyester composition in an amount from 99.99% to about 95% by weight of the polyester composition and the additive is present in the polyester composition in an amount from about 0.01% to about 5% by weight of the polyester composition. In accordance with still another embodiment of this invention, the PET copolymer is present in the polyester composition in an amount from about 97% to about 95% by weight of the polyester composition and the additive is present in the polyester composition in an amount from about 3% to about 5% by weight of the polyester composition.

In accordance with embodiments of this invention, the organic gas barrier enhancing additive and the polycondensation catalyst deactivating agent are combined with the polyester composition by blending the polyester having catalyst residue and the organic gas barrier enhancing additive compound and the polycondensation catalyst deactivating agent under conditions of melt processing comprising heating the polyester in solid form to melt the polyester, adding the organic gas barrier enhancing additive and the polycondensation catalyst deactivating agent to the polyester composition, and mixing the organic gas barrier enhancing additive and polycondensation catalyst deactivating agent with the molten polyester at conditions such that at least a portion of the organic gas barrier enhancing additive remains unreacted with the polyester and is disposed in the free volume of the polyester. Melt processing temperatures of PET copolymers, for example, range from about 270 to about 300° C. According to foregoing embodiments, the blend of the organic gas barrier enhancing additive and the polyester remain at melt processing temperatures for less than five minutes and preferably from about one to three minutes. This amount of time allows for adequate mixing of the components, but does not provide for excessive reaction between the organic gas barrier additive and the polyester.

As the mechanism of the barrier enhancement is filling the free volume of the polyester, once the barrier enhancing additive is incorporated into the polyester chain by chemical reaction, the additive is not able to move freely to fill the free volume of the polyester and its effectiveness in barrier enhancement is reduced. Thus, during melt processing of polyester such as PET copolymer and organic gas barrier enhancing additive, the melt temperature and cycle time are preferably minimized to minimize the possibility of a reaction between the polyester and the additive. Low melting temperature and short cycle time have already been practiced in injection molding to reduce degradation of PET copolymers and to save energy during production. The typical temperature for PET copolymer melt processing is between 270 and 300° C. and the melt residence time is typically less than two minutes. To reduce the reaction between the organic barrier enhancing additive and PET copolymer, the injection molding preferably is run as low as possible.

As described above, the polyester composition of this invention is useful for making containers in which enhanced gas barrier is desirable. In short, such containers are made by forming the above described polyester compositions into the desired container by conventional methods such as melt forming. Suitable melt forming processes include, but are not limited to, injection molding, extrusion, thermal forming and compression molding. The particularly preferred method for making the containers of this invention is stretch blow molding.

FIG. 1 illustrates a system 10 in accordance with an embodiment of this invention for making a rigid container preform 12 (illustrated in FIG. 2) and a rigid container 14 (illustrated in FIG. 3) from the preform. As is shown in FIG. 1, solid PET copolymer pellets 20, an organic gas barrier enhancing additive such as dimethyl terephthalate (DMT) 22, and optionally a catalyst deactivating agent, are added to a feeder or hopper 24 that delivers the components to a hot melt extruder 26 in which the components are melted and blended. The hot melt extruder 26 then extrudes the molten mixture of PET copolymer, organic gas barrier enhancing additive, and optionally the catalyst deactivating agent, into an injection molding device 28 to form the preform 12. The preform is cooled and removed from the injection molding device 28 and delivered to a stretch blow molding device 30 which stretch blow molds the preform 12 into a finished rigid container 14.

As explained above, the melt residence time of the preform production is preferably less than five minutes and more preferably from about one to about three minutes. The melt temperatures are desirably from 270 to about 300° C. and more desirably from about 270 to about 290° C. The melt residence time begins when the PET copolymer, catalyst deactivating agent, and organic barrier enhancing additive enter the melt extruder 26 and start melting, and ends after injection of the molten blend into the injection mold to form the preform 12.

As is well known to those skilled in the art, containers can be made by blow molding a container preform. Examples of suitable preform and container structures and are disclosed in U.S. Pat. No. 5,888,598, the disclosure of which is expressly incorporated herein by reference in its entirety.

Figures 2, 3, 4:
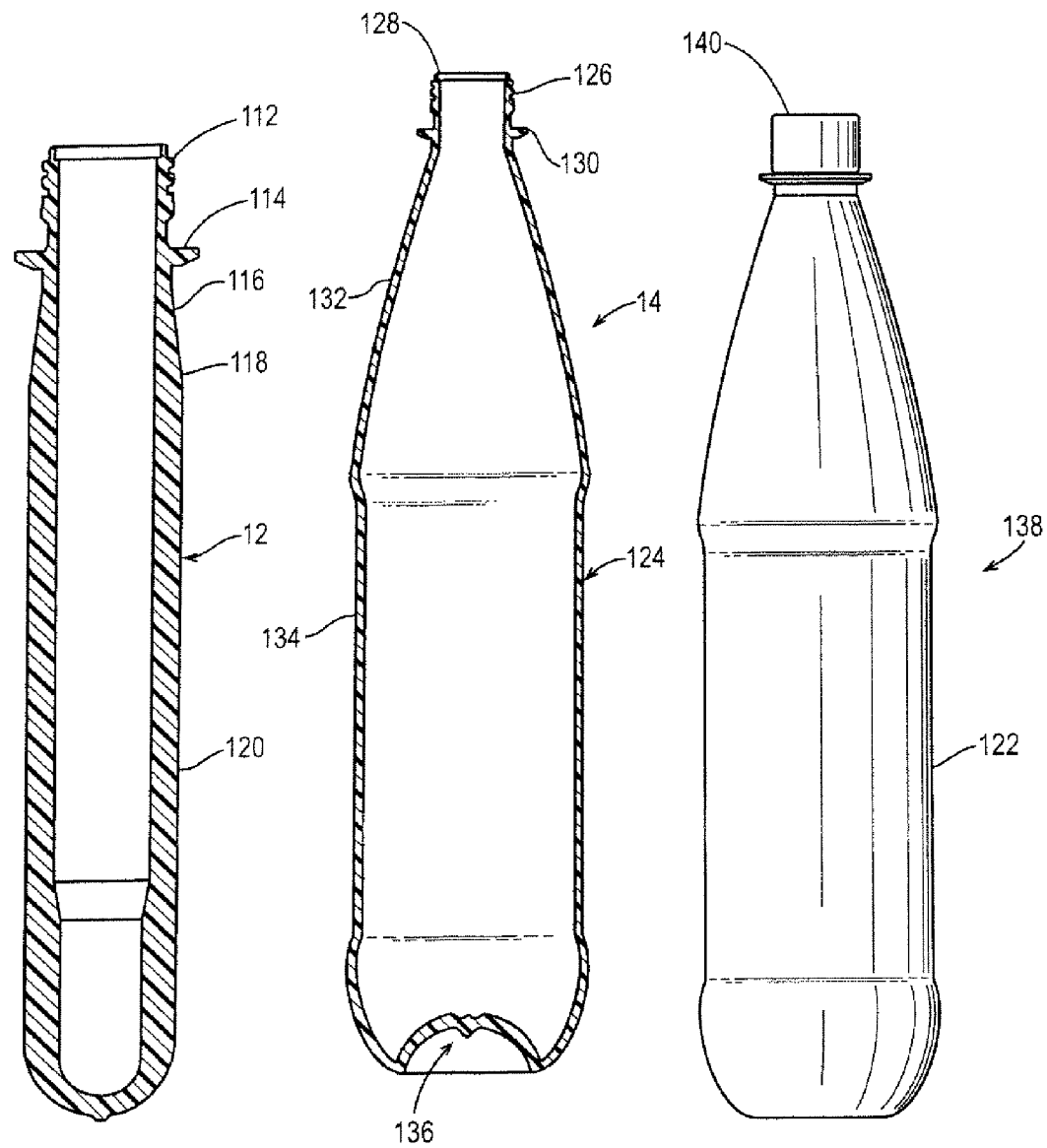
FIG. 2 is a sectional elevation view of a molded container preform made in accordance with an embodiment of this invention.
FIG. 3 is a sectional elevation view of a blow molded container made from the preform of FIG. 2 in accordance with an embodiment of this invention.
FIG. 4 is a perspective view of a packaged beverage made in accordance with an embodiment of this invention.

Turning to FIG. 2, a polyester container preform 12 is illustrated. This preform 12 is made by injection molding PET based resin and comprises a threaded neck finish 112 which terminates at its lower end in a capping flange 114. Below the capping flange 114, there is a generally cylindrical section 116 which terminates in a section 118 of gradually increasing external diameter so as to provide for an increasing wall thickness. Below the section 118 there is an elongated body section 120.

The preform 12 illustrated in FIG. 2 can be stretch blow molded to form a container 14 illustrated in FIGS. 3 and 4. The container 14 comprises a shell 124 comprising a threaded neck finish 126 defining a mouth 128, a capping flange 130 below the threaded neck finish, a tapered section 132 extending from the capping flange, a body section 134 extending below the tapered section, and a base 136 at the bottom of the container. The container 14 is suitably used to make a packaged beverage 138, as illustrated in FIG. 4. The packaged beverage 138 includes a beverage such as a carbonated soda beverage disposed in the container 14 and a closure 140 sealing the mouth 128 of the container.

The preform 12, container 14, and packaged beverage 138 are but examples of applications using the preforms of the present invention. It should be understood that the process and apparatus of the present invention can be used to make preforms and containers having a variety of configurations.

The present invention is described above and further illustrated below by way of examples which are not to be construed in any way as imposing limitations upon the scope of the invention. On the contrary, it is to be clearly understood that resort may be had to various other embodiments, modifications, and equivalents thereof which, after reading the description herein, may suggestion themselves to those skilled in the art that without departing from the scope of the invention and the appended claims.

EXAMPLE 1

An experimental PET resin was made using a Ti catalyst. The resin contained no antimony, cobalt, zinc, or manganese. The PET copolymer was dried in a vacuum oven at 140° C. overnight to a moisture level below 50 ppm. The additives were dried in a vacuum oven at 100° C. for 2 hours to remove the surface moisture. The PET copolymer and loading levels of 3 wt % of DMT or DMI were mixed and then injection molded in a lab Arburg unit cavity injection molding machine to make 24.5-g 500-ml preforms. The preforms were then blow molded with a Sidel SBO 2/3 blow molding machine to make acceptable 500 ml bottles. The oxygen transmission rate of the bottles was measured using a Mocon 2/60 model instrument at 22.2° C. and 50% RH with the 99% $N_2$/1% $H_2$ purging rate of 10 ml/min. The results are shown in Table 1. Also shown in this table are the preform IV results, measured according to ASTM D 4603-96 at 30° C. with 0.5 weight percent concentration in a 60/40 (by weight fraction) phenol/1,1,2,2-tetrachloroethane solution. Both DMT and DMI have acceptable IVs for polyester compositions comprising polyester having Ti catalyst residue.

TABLE 1

| Barrier Additives | Barrier Additive CAS # | Oxygen transmission rate (cc/pkg/day) | Barrier improvement factor (BIF) | IV measured on preforms |
|---|---|---|---|---|
| Experimental PET | | 0.046 | 1.00 | 0.75 |
| 3% dimethyl terephthalate | 120-61-6 | 0.034 | 1.35 | 0.72 |
| 3% dimethyl isophthalate | 1459-93-4 | 0.030 | 1.53 | 0.74 |

EXAMPLE 2

A commercially available PET copolymer bottle grade resin manufactured by Eastman Chemical, in Kingsport, Tenn., with less than 3 mole % of cyclohexanedimethanol modification to the diol, was used as control. The PET copolymer was dried in a vacuum oven at 140° C. overnight to a moisture level below 50 ppm. The additives were dried in a vacuum oven at 100° C. for 2 hours to remove the surface moisture. The PET copolymer and 5 wt % loading level of additive was mixed and then injection molded in a lab Arburg unit cavity injection molding machine to make 26.5-g preforms. The preforms were blow molded with a Sidel SBO 2/3 blow molding machine to make acceptable 20-oz bottles. The bottles' barrier properties were then determined using a FTIR instrument according to the method disclosed in U.S. Pat. No. 5,473,161. The shelf life, in weeks, is shown in Table 2. The higher the shelf life, the higher the barrier. A shelf life improvement of 20% or more is considered to be effective. Shelf life of a container is determined by the amount of time the package retains CO2 under controlled conditions of 22° C. and 50% relative humidity. The values reported are for 17.5% CO2 loss bottles pressurized with CO2 gas to an equivalent pressure of 4 volumes of CO2/volume of water and are measured by the use of Fourier Transform Infrared Spectroscopy (FT-IR). The values for the shelf-life increase are calculated by the ratio of the bottle with additive to a bottle of the same resin without additive.

TABLE 2

| Barrier Additive | Barrier Additive CAS # | Shelf life (weeks) | % increase in shelf life |
|---|---|---|---|
| Eastman PET control | | 8.7 | 0 |
| 5% Dimethyl terephthalate (DMT) | 120-61-6 | 11.1 | 27.6 |
| 5% Dimethyl isophthalate (DMI) | 1459-93-4 | 13.7 | 57.5 |
| 5% Diethyl phthalate (DEP) | 84-66-2 | 10.7 | 23 |
| 5% Diphenyl phthalate (DPP) | 84-62-8 | 10.7 | 23 |

As shown in Table 2, addition of gas barrier enhancing additives was effective at a 5 wt % loading level. Furthermore, the more similar the solubility parameters of the additive and PET, the greater the gas barrier properties, as explained hereinabove.

U.S. Pat. No. 6,150,454 discloses a PET/PEI composition with higher barrier properties than traditional bottle grade PET. When a nominal loading level of 10 mole % PIA was used, there was a maximum improvement of 25% in $CO_2$ shelf life. In the example above, 5 wt % loading level of DMI translates into 5.67 nominal mole % loading level of PIA if all DMI is reacted and incorporated into the PET chain, which is well below the nominal loading level of 10 mole % reported in U.S. Pat. No. 6,150,454. The lower loading level of our example results in 57.5% improvement in shelf life as compared to the 25% improvement in shelf life derived from the nominal loading level of 10 mole % PIA incorporated into the PET chain as disclosed in U.S. Pat. No. 6,150,454. These results show that the gas barrier enhancement from DMI is not due to the contribution of DMI incorporated into the PET chain, as was in the case of U.S. Pat. No. 6,150,454, but rather is due to the free volume suppression and anti-plasticization.

EXAMPLE 3

To show the effect of the catalyst choice on the IV of the polymer composition, several different polymer resins were subjected to metals analysis to insure that they were free of cobalt, antimony, zinc, manganese, magnesium, cesium, calcium, and cadmium residues. The catalyst and concentrations of metal residues are shown in Table 3.

TABLE 3

| Conc. in ppm (ug/gram) | Wellman Ti 818 | Zimmer CC3 | 8006 M & G | CB12 Vordian | Mitsui C135 | Toyobo SB-IPET | Toyobo GS-IPET | 1101E Invista | Blank |
|---|---|---|---|---|---|---|---|---|---|
| Li | 0.08 | 0.00 | 0.00 | 0.00 | 0.00 | 0.00 | 0.00 | 0.00 | 0.00 |
| Mg | 0.14 | 0.61 | 0.79 | 0.31 | 0.83 | 0.34 | 0.15 | 0.10 | 0.32 |
| Al | 0.20 | 1.00 | 1.50 | 0.28 | 13.00 | 0.41 | 17.00 | 0.23 | 0.47 |
| Ca | 0.00 | 0.00 | 1.20 | 2.30 | 13.00 | 0.00 | 0.87 | 0.00 | 1.80 |
| Ti | 28.00 | 21.00 | 1.80 | 0.30 | 63.00 | 0.26 | 0.46 | 0.13 | 0.28 |
| Mn | 0.29 | 0.52 | 0.84 | 0.13 | 0.50 | 0.05 | 0.05 | 0.18 | 0.06 |
| Co | 25.00 | 0.52 | 0.26 | 1.10 | 0.35 | 0.06 | 0.06 | 35.00 | 0.34 |
| Zn | 0.11 | 0.29 | 0.93 | 1.50 | 0.97 | 0.13 | 0.38 | 0.15 | 0.94 |
| Sb | 0.94 | 0.36 | 210.00 | 200.00 | 0.30 | 220.00 | 0.11 | 210.00 | 0.01 |
| Fe | 0.21 | 1.40 | 19.00 | 0.39 | 1.40 | 0.46 | 0.40 | 0.36 | 2.20 |

The following resins were substantially free of cobalt, antimony, zinc, manganese, magnesium, cesium, calcium, and cadmium: Zimmer CC3, Mitsui C135, Toyobo GS-IPET.

The resins shown in Table 3 were combined with DMI and/or DMT in the same manner as described in Example 1 and the IV of the preform or extrudate was measured. Several samples were co-mixed with various phosphorous deactivating or sequestering agents to demonstrate the futility of deactivating agents. The IV results are shown in Table 4.

TABLE 4

Part 1

| Resin | Additive | Level | IV | ΔIV |
|---|---|---|---|---|
| Invista 1101E | — | Control | 0.802 | 0 |
| | DMT | 3% | 0.677 | 0.125 |
| | DMT | 5% | 0.546 | 0.256 |
| | DMI | 3% | 0.701 | 0.101 |
| | DMI | 5% | 0.610 | 0.192 |
| | DMT/Ultranox 626[1] | 5%/0.5% | 0.563 | 0.239 |
| | DMI/Ultranox 626[1] | 5%/0.5% | 0.707 | 0.095 |
| | DMT/PPA[2] | 5%/30 ppm | 0.494 | 0.308 |
| | DMI/PPA[2] | 5%/30 ppm | 0.641 | 0.161 |
| Voridian CB12 | — | Control | 0.76 | 0 |
| | DMT/Clariant CE[3] | 3%/0.5% | 0.72 | 0.040 |
| | DMI/Clariant CE[3] | 3%/0.5% | 0.71 | 0.050 |
| | DMI | 3% | 0.69 | 0.07 |
| Zimmer CC3 | — | Control | 0.75 | 0 |
| | DMT | 3% | 0.72 | 0.03 |
| | DMI | 3% | 0.74 | 0.01 |
| | DMT/CDPO[4] | 3%/500 ppm | 0.72 | 0.03 |
| | DMI/CDPO[4] | 3%/500 ppm | 0.74 | 0.01 |
| Mitsui | — | Control | 0.73 | 0 |
| | DMT | 3% | 0.63 | 0.10 |
| | DMI | 3% | 0.65 | 0.08 |
| M&G 8006 | — | Control | 0.75 | 0 |
| | DMT | 3% | 0.59 | 0.16 |
| | DMI | 3% | 0.66 | 0.09 |
| Part 2 | | | | |
| Wellman Ti818 | — | Control | 0.73 | 0 |
| | DMT | 3% | 0.51 | 0.22 |
| | DMI | 3% | 0.61 | 0.12 |
| Toyabo GS-IPET | — | Control | 0.82 | 0 |
| | DMI | 3% | 0.77 | 0.05 |
| Futura | — | Control | 0.79 | 0 |
| | DMI | 3% | 0.80 | −0.01 |
| | DMI/Ultranox 626 | 3%/0.2% | 0.80 | −0.01 |

[1]Ultranox 626 is a phosphorus compound added to scavenge excess transition metal catalyst residues.
[2]PPA is polyphosphoric acid; also scavenges excess transition metal catalyst residues.
[3]Chain Extender ("CE")
[4]CDPO is also a phosphorus based metal scavenger.

The difference in the IV of the Zimmer resin, the Toyobo GS-IPET, and Futura resin fall within the preferred embodiments of this application. The use of deactivating agents was not sufficient to expand the scope of the technology to include cobalt, antimony, zinc, manganese, magnesium, cesium, calcium, and cadmium. The gas barrier to $O_2$ and $CO_2$ for the Zimmer and Toyobo GS-IPET resins are shown in Table 5.

TABLE 5

| Resin | Additive | Level | $CO_2$ BIF[1] | $O_2$ BIF[1] | BIF to current resin[2] |
|---|---|---|---|---|---|
| Zimmer CC3 | DMT | 3% | — | 1.35 | 1.30 ($O_2$) |
| Zimmer CC3 | DMI | 3% | — | 1.54 | 1.49 ($O_2$) |
| Toyobo GS-IPET | DMI | 3% | 1.27 | — | 1.47 ($CO_2$) |

[1]BIF is measured against the same base resins.
[2]Zimmer CC3 was compared to Invista 1101E resin and Toyobo GS-IPET was compared to Voridian CB12 resin It should be understood that the foregoing relates to particular embodiments of the present invention, and that numerous changes may be made therein without departing from the scope of the invention as defined by the following claims.

What is claimed is:

1. A container comprising a polyester composition comprising:
    a polyester comprising a poly(ethylene terephthalate) based copolymer (PET copolymer) made using at least one first polycondensation catalyst selected from the group consisting of metals in groups 3, 4, 13, and 14 of the Periodic Table and comprising a catalyst residue remaining in the polyester from formation of the polyester, the catalyst residue comprising at least a portion of the at least one first polycondensation catalyst; and
    a reactive organic gas barrier enhancing additive, wherein the reactive organic gas barrier enhancing additive is a compound having the chemical formula R1OOC-AR—COOR2, wherein AR is selected from the group consisting of phenylene and naphthalene, and R1 and R2 are selected from the group consisting of C1 to C10 alkyl groups, a phenyl group, and a naphthyl group; and
    a polycondensation catalyst deactivating agent for reducing the reactivity of the catalyst residue with the polyester;
    wherein the polyester composition has an IV of 0.65 dL/g to 1.0 dL/g.

2. A container as in claim 1 wherein the polyester composition has an IV from about 0.70 dL/g to about 0.86 dL/g.

3. A container as in claim 1 wherein the polyester composition has an IV from about 0.75 dL/g to about 0.86 dL/g.

4. A container as in claim 1 wherein the at least one first polycondensation catalyst selected from the group consisting of titanium, aluminum, germanium, and gallium.

5. A container as in claim 1 wherein the polyester has a first solubility parameter and a free volume and the organic gas barrier enhancing additive has a second solubility parameter, at least a portion of the additive being unreacted with the polyester and disposed in the free volume of the polyester, the second solubility parameter being no more than 20% lesser or greater than the first solubility parameter.

6. A container as in claim 1 wherein the polyester is present in the polyester composition in an amount from about 99.99% to about 90% by weight of the polyester composition and the organic gas barrier enhancing additive is present in the polyester composition in an amount from about 0.01% to about 10% by weight of the polyester composition.

7. A container as in claim 1 wherein the polyester comprises a poly(ethylene terephthalate) based copolymer (PET copolymer) having less than 20% diacid component modification and/or less than 10% diol component modification, based on 100 mole % diacid component and 100 mole % diol component.

8. A container as in claim 1 wherein R1 and R2 are selected from the group consisting of C1 to C6 alkyl groups, a phenyl group, and a naphthyl group.

9. A container as in claim 1 wherein the PET copolymer is present in the polyester composition in an amount from about 99.99% to about 90% by weight of the polyester composition and the organic gas barrier enhancing additive is present in the polyester composition in an amount from about 0.01% to about 10% by weight of the polyester composition.

10. A container as in claim 1 wherein the polycondensation catalyst deactivating agent is present in the polyester composition in an amount from about 50 ppm to about 500 ppm.

11. A container as in claim 1 wherein the container is a stretch blow molded rigid container comprising a base, an open ended mouth, and a body extending from the base to the open ended mouth.

12. A container as in claim 11 suitable to use in making a packaged beverage.

13. A container comprising a polyester composition comprising:
- a polyester comprising a poly(ethylene terephthalate) based copolymer (PET copolymer) made using at least one first polycondensation catalyst selected from the group consisting of metals in groups 3, 4, 13, and 14 of the Periodic Table and comprising a catalyst residue remaining in the polyester from formation of the polyester, the catalyst residue comprising at least a portion of the at least one first polycondensation catalyst;
- a second polycondensation catalyst selected from the group consisting of cobalt, antimony, zinc, manganese, magnesium, cesium, calcium, and cadmium wherein the second polycondensation catalyst is present in the polyester composition in an amount up to 3 ppm of the polyester composition; and
- a reactive organic gas barrier enhancing additive, wherein the reactive organic gas barrier enhancing additive is a compound having the chemical formula R1OOC-AR-COOR2, wherein AR is selected from the group consisting of phenylene and naphthalene, and R1 and R2 are selected from the group consisting of C1 to C10 alkyl groups, a phenyl group, and a naphthyl group;
- wherein the polyester composition has an IV of 0.65 dL/g to 1.0 dL/g.

14. A container comprising a polyester composition comprising:
- a polyester comprising a poly(ethylene terephthalate) based copolymer (PET copolymer) made using at least one first polycondensation catalyst selected from the group consisting of metals in groups 3, 4, 13, and 14 of the Periodic Table and comprising a catalyst residue remaining in the polyester from formation of the polyester, the catalyst residue comprising at least a portion of the at least one first polycondensation catalyst; and
- a reactive organic gas barrier enhancing additive, wherein the organic gas barrier enhancing additive is a compound selected from the group consisting of dimethyl terephthalate, dimethyl isophthalate, 2,6-dimethyl naphthalate, diethyl terephthalate, and diethyl isophthalate;
- wherein the polyester composition has an IV of 0.65 dL/g to 1.0 dL/g.

* * * * *